United States Patent
Dechao

(10) Patent No.: US 8,241,685 B2
(45) Date of Patent: Aug. 14, 2012

(54) PROCESSING METHOD AND DEVICE FOR EXTRUSION OF RAW MATERIALS WITH ENZYMES ADDED FOR PRODUCTION OF STARCH SYRUP, AND SACCHAROGENIC METHOD FOR EXTRUDED RAW MATERIALS

(75) Inventor: Shen Dechao, Shandong (CN)

(73) Assignee: Shandong University of Technology, Zibo, Shandong (CN)

( * ) Notice: Subject to any disclaimer, the term of this patent is extended or adjusted under 35 U.S.C. 154(b) by 697 days.

(21) Appl. No.: 12/327,156

(22) Filed: Dec. 3, 2008

(65) Prior Publication Data

US 2009/0214707 A1  Aug. 27, 2009

(30) Foreign Application Priority Data

Feb. 25, 2008 (CN) .......................... 2008 1 0014637

(51) Int. Cl.
*A23L 1/09* (2006.01)
(52) U.S. Cl. .............. 426/20; 426/48; 426/52; 426/330; 426/661; 127/70
(58) Field of Classification Search .................... 426/18, 426/20, 48, 52, 330, 661; 127/65–71
See application file for complete search history.

(56) References Cited

U.S. PATENT DOCUMENTS

| | | | | |
|---|---|---|---|---|
| 3,922,196 A | * | 11/1975 | Leach et al. ..................... | 435/95 |
| 3,950,543 A | * | 4/1976 | Buffa et al. ...................... | 426/18 |
| 4,167,584 A | * | 9/1979 | Nelson ............................. | 426/2 |
| 5,833,757 A | * | 11/1998 | Verhoff et al. ................... | 127/42 |
| 5,904,940 A | * | 5/1999 | Senkeleski et al. .............. | 426/52 |
| 6,569,653 B1 | * | 5/2003 | Alard et al. ..................... | 435/161 |
| 6,685,974 B2 | * | 2/2004 | Whalen ............................ | 426/52 |
| 2007/0184150 A1 | * | 8/2007 | Bhargava et al. ................ | 426/52 |
| 2008/0299256 A1 | * | 12/2008 | Batie et al. ...................... | 426/52 |
| 2009/0214702 A1 | * | 8/2009 | Dechao ............................ | 426/14 |
| 2010/0203222 A1 | * | 8/2010 | Dechao ............................ | 426/632 |

FOREIGN PATENT DOCUMENTS

CN 1282785 A 2/2001
(Continued)

OTHER PUBLICATIONS

Liu Yawei, Technology of Production and Transformation of Corn Starch [M], Chemical Industry Press, Beijing, 2004.
(Continued)

*Primary Examiner* — Drew E Becker
(74) *Attorney, Agent, or Firm* — Michael Best & Friedrich LLP

(57) ABSTRACT

This invention relates generally to the field of starch syrup production, specifically to a processing method and a device for the extrusion of raw materials with enzymes added for starch syrup, and a saccharogenic method of the extruded raw materials. This invention discloses the kind and amount of enzymes added, the appropriate parameters of the processing method and the device for the extrusion of raw materials with enzymes added for starch syrup, and the appropriate saccharogenic method of the extruded raw materials for starch syrup. The processing method and the device of this invention are such that the jet liquefaction process as used in the traditional double enzyme method for starch syrup production can be spared, and starch syrup with the same DE value can be obtained in a saccharification time which can be shorten 2-4 times the traditional saccharification time.

12 Claims, 1 Drawing Sheet

FOREIGN PATENT DOCUMENTS

| | | | |
|---|---|---|---|
| CN | 1775955 | A | 5/2006 |
| CN | 1814723 | A | 8/2006 |
| CN | 1952096 | A | 4/2007 |
| CN | 101050406 | A | 10/2007 |
| CN | 101054605 | A | 10/2007 |
| CN | 101054605 | A * | 10/2011 |

OTHER PUBLICATIONS

You Xin, Manual of Production and Application of Starch Sugars [M], China Light Industry Press, Beijing, 1999.

M.J.E.C. van der Maarel, Properties and Applications of Starch-Converting Enzymes of the O-Amylase Family, Journal of Biotechnology 94 (2002), pp. 137-155.

Yang Mingduo, Study of the Application of Puffing Technology in the Production of Starch Sugars, Journal of the Chinese Cereals and Oils Association(J), 1989 (2): 38-45.

N. D. Frame, The Technology of Extrusion Cooking, Printed in Great Britain by St. Edimundsbury Press, 1994: 237-250.

* cited by examiner

PROCESSING METHOD AND DEVICE FOR EXTRUSION OF RAW MATERIALS WITH ENZYMES ADDED FOR PRODUCTION OF STARCH SYRUP, AND SACCHAROGENIC METHOD FOR EXTRUDED RAW MATERIALS

RELATED APPLICATION DATA

This application claims the benefit under 35 U.S.C. §119 (a) of currently-pending Chinese Patent Application No. CN200810014637.0 filed Feb. 25, 2008, the entire contents of which are hereby incorporated by reference.

FIELD OF INVENTION

This invention relates generally to the field of starch syrup production. Specifically, this invention relates to a processing method and a device for the extrusion of raw materials with enzymes added for production of starch syrup, and a saccharogenic method for the extruded raw materials.

BACKGROUND ART

At present, double enzyme method is employed to produce corn starch syrup. This method involves the following processes: corn—cleaning (impurity removal)—steeping—separating germ by wet milled method—separating fiber—separating gluten (separating proteins)—starch milk—gelatinization and liquefaction (adding high temperature-resistant α-amylase)—saccharification (adding glucoamylase)—corn syrup (Liu Yawei, Technology of Corn Starch-Producing and Converting [M], Chemical Industry Press, Beijing, 2004; You Xin, Manual of Production and Application of Starch Sugars [M], China Light Industry Press, Beijing, 1999; M. J. E. C. van der Maarel, etc. Properties and Applications of Starch-converting Enzymes of the α-amylase Family. Journal of Biotechnology, 2002, 94:137-155). The above method will consume a significant amount of water and electricity and pose environmental pollution problems.

Scholars in China have tried to use extrusion-expanding corn degermed to produce corn starch sugars (Yang Mingduo, Study on the Application of Extrusion-Expanding Technology in the Production of Starch Sugars, Journal of the Chinese Cereals and Oils Association [J], 1989 (2): 38~45; Yang Erna, The Technology of Starch Sugar[M], Heilongjiang Science and Technology Press, Harbin, 1990:231~232). The technology involves the following processes: corn—cleaning (impurity removal)—extrusion-expanding of the degermed corn flour—slurrying (the ratio of extrusion-expanding degermed corn flour to water is 1:5 or 1:6)—liquefaction (adding medium-temperature amylase, raising the temperature to 88-92° C.)—saccharification (adding glucoamylase)—corn syrup. To date, it is still hard for this technology to be applied to actual production due to the difficulties in the saccharification and filtration of the saccharification liquor.

Chinese patent CN200510045327.1 to Shen Dechao (Title: Processing method and device for the extrusion-cooking of raw materials for starch syrup, and saccharogenic method of the extrusion-cooked raw materials for starch syrup; Application date: Dec. 9, 2005) addresses the above-said difficulties in the saccharification and filtration of the saccharification liquor. However, a saccharification time of about 30 hours is still needed in order to obtain corn syrup with relatively higher DE value, for example DE=95%.

Chinese patent CN200710015601.X to Shen Dechao (Title: Processing method and device for the extrusion of raw materials with enzymes added for starch syrup, and saccharogenic method of the extruded raw materials for starch syrup; Application date: May 11, 2007) favorably solves the above problem, so that a saccharification time of less than 30 hours is needed in order to obtain corn syrup with relatively higher DE value, for example DE=95%.

However, the above-mentioned prior art did not disclose the kind and amount of enzymes added prior to extrusion of raw materials for starch syrup, the kind and amount of α-amylase added in the gelatinization stage of the saccharification process, and the kind and amount of glucoamylase added in the saccharification stage of the saccharification process. The parameters of the prior-art processing method and device for the extrusion of raw materials for starch syrup with enzymes added are still less than appropriate, and the saccharogenic method of the extruded raw materials for starch syrup needs further improvement.

Extensive experiments indicated that only by overcoming the above disadvantages of prior art, can the starch in the raw materials for starch syrup extruded with enzymes added be degraded more thoroughly, and therefore saccharified more efficiently.

SUMMARY OF INVENTION

This invention provides a processing method and a device for the extrusion of raw materials with enzymes added for starch syrup, and saccharogenic method of the extruded raw materials for starch syrup, wherein said processing method and device, useful in the production of starch syrup, are such that the starch in the raw materials for starch syrup extruded with enzymes added can be degraded more thoroughly, so that corn syrup with relatively higher DE value (for example DE=95%) can be obtained in a relatively shorter saccharification time.

In one aspect of this invention, there is provided a device for the extrusion of raw materials with enzymes added for starch syrup.

The device basically comprises a whole of an axially bisectable barrel set and a whole of a screw set. The whole of the barrel set comprises the first barrel 2, the second barrel 4, the third barrel 5 and the fourth barrel 7, wherein each barrel is axially bisectable and the whole of the barrel set is thus also axially bisectable. The first barrel 2, the second barrel 4, the third barrel 5 and the fourth barrel 7 are assembled in the numbering order and can be closed when the device is in operation by locking the upper part and lower part of each of the above-said barrels with fastener 14 and fastener 16, fastener 13 and fastener 17, fastener 12 and fastener 18, and fastener 11 and fastener 19 respectively. The whole of the screw set comprises the main shaft 15, the first screw 1, the second screw 6 and the third screw 10, wherein each screw is installed enclosing the main shaft 15 in the numbering order and rotates with the main shaft 15. After disassembling the die plate 8 and the above-said fasteners, the two bisectable halves of the whole of the barrel set consisting of the corresponding two bisectable halves of the first barrel 2, the second barrel 4, the third barrel 5 and the fourth barrel 7 assembled together can be rotated outward around shaft A and shaft B respectively so that the two bisectable halves of the barrel set are opened apart from each other. The first barrel 2 is not heated or cooled. The outer surfaces of the second barrel 4, the third barrel 5 and the fourth barrel 7 are heated by pressurized hot steam or electricity and forcedly cooled by cooling water or air, so that the temperatures in the barrels can be adjusted automatically.

The first screw 1, the second screw 6 and the third screw 10 enclosing the main shaft 15 have external threads in the opposite rotational direction to the continuous internal thread on the inner surface of the second barrel 4, the third barrel 5 and the fourth barrel 7. The external threads of the second screw 6 and the third screw 10 have a helix angle approximately equal to the helix angle of the continuous internal thread on the inner surface of the second barrel 4, the third barrel 5 and the fourth barrel 7. The volume between the end surface of the small end of the third screw 10 and the internal surface of die plate 8 should be 0.3 to 9 times the theoretical output volume produced when the small end of the third screw 10 rotates one revolution. The whole of the screw set has a length-diameter ratio of 5-20 and a compression ratio of 5-35. The die nozzle 9 of the die plate 8 has an adjustable diameter ranging from φ3 mm to φ22 mm and an adjustable length ranging from 5 mm to 30 mm.

In another aspect of this invention, there is provided a processing method for the extrusion of raw materials with enzymes added, wherein the extruded raw materials with enzymes added is used for the production of starch syrup.

The raw materials for starch syrup, before extrusion, with a moisture content percentage being less than 15% are milled and passed through a sieve with a mesh of 1.5 mm to 7 mm. Then the milled raw materials for starch syrup are adjusted to a moisture content percentage of 15% to 50%, added with a suitable amount of enzymes, and adjusted to a pH in the range of 5.0-7.0. The mixture thus obtained is subjected to extrusion using the above-said device. The first barrel 2 is not heated or cooled. The second barrel 4, the third barrel 5 and the fourth barrel 7 are in an automatically adjustable temperature ranging from 13° C. to 55° C., 13° C. to 75° C. and 20° C. to 90° C. respectively. The whole of the screw set consisting of the first screw 1, the second screw 6 and the third screw 10 rotates at an adjustable rotation speed ranging from 25 rpm to 280 rpm. The extruded raw materials with enzymes added for starch syrup are cooled to room temperature, then are subjected to low-temperature drying with the temperature of drying no higher than 85° C. The dried materials extruded, with a moisture content percentage of less than 15%, are milled and passed through a sieve with a mesh of 2 mm to 9 mm. Alternatively, the raw materials extruded for starch syrup with enzymes added are minced by the cutter, cooled to room temperature for later use.

The enzymes added to the raw materials for starch syrup before extrusion include one kind or more kinds of high temperature-resistant α-amylase, high-efficient thermostable α-amylase, medium-temperature amylase, glucoamylase, glucose amylase, high-efficient glucoamylase and strongly-efficient glucoamylase, and the suitable amount of addition is 0.2 L to 1.5 L or 0.2 kg to 1.5 kg per ton of raw materials for starch syrup.

The extruded raw materials with enzymes added for starch syrup include one kind or more kinds of rice, degermed corn, undegermed corn, sorghum, barley, wheat, or starch or raw starch thereof, extruded with enzymes added.

In yet another aspect of this invention, there is provided a saccharogenic method of the extruded raw materials with enzymes added for starch syrup.

Slurrying of the milled or minced raw materials extruded with enzymes added for starch syrup is performed by mixing with water in a ratio of the materials to water of 1:1.3 to 1:3.5, adjusting to pH=6.0-7.0 and adding suitable amounts of calcium ion, acid reagent, α-amylase and glucoamylase. Liquefying is performed by raising the temperature to 65° C. to 100° C. and holding the slurry at this temperature for 5 min to 70 min or by spraying above slurry and raising the temperature of the slurry to 65° C. to 100° C., then flash vaporizing of the slurry and cooling the temperature of the slurry to 60° C. to 90° C., and holding the slurry at this temperature for 5 min to 70 min. The liquefied slurry is cooled to 45° C. to 70° C. and adjusted to pH=3.8-5.5 Then saccharifying is performed by adding a suitable amount of glucoamylase and holding the slurry for several hours. Enzyme inactivation is performed, after confirmation of the absence of dextrin by anhydrous alcohol, by adjusting to pH=4.5-5.5, heating to 80° C. to 95° C. and holding at this temperature for 5 min to 70 min. Then the slurry is cooled to 60° C. to 70° C. and filtered to obtain the saccharification liquor The α-amylase and glucoamylase added during slurrying include one kind or more kinds of medium-temperature amylase, high temperature-resistant α-amylase, high-efficient thermostable α-amylase, glucoamylase, glucose amylase, high-efficient glucoamylase and strongly-efficient glucoamylase, and the suitable amount of addition is 0.2 L to 1 L or 0.2 kg to 1 kg per ton of raw materials for starch syrup.

The glucoamylase added during saccharification includes one kind or more kinds of glucoamylase, glucose amylase, high-efficient glucoamylase and strongly-efficient glucoamylase, and the suitable amount of addition is 0.4 L to 2 L or 0.4 kg to 2 kg per ton of raw materials for starch syrup.

During raising the temperature of the above-mentioned saccharification liquor, the paddles in the saccharifying tank which stir the saccharification liquor, rotate at a speed of 4 rpm to 70 rpm, while during keeping the saccharification liquor at certain temperature, the paddles rotate at a speed of 1 rpm to 60 rpm when liquifying and saccharifying.

This invention has the following advantages as compared to the prior art:

1. This invention discloses the kind and amount of enzymes added prior to extrusion of raw materials for starch syrup, the kind and amount of α-amylase added in the gelatinization stage of the saccharification process, and the kind and amount of glucoamylase added in the saccharification stage of the saccharification process, which kinds and amounts were not disclosed in the prior art. This invention also discloses the appropriate parameters for the device and the processing method for the extrusion of raw materials for starch syrup with enzymes added, and the saccharogenic method of the extruded raw materials for starch syrup.

2. The research results of extensive experiments indicate that the device and processing method of this invention are such that the jet liquefaction process as used in the traditional double enzyme method for producing starch syrup can be spared and starch syrup with a DE value of 95% or above can be obtained after a saccharification time of 8 to 15 hours.

DETAILED DESCRIPTION

This invention is further described with reference to the drawings.

Figure 1:
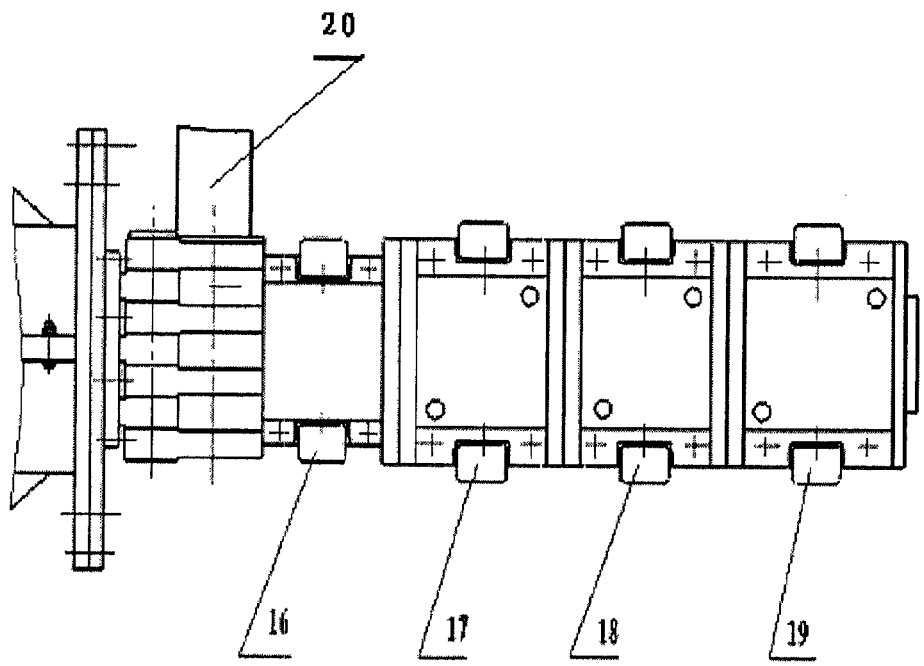
FIG. 1 is the front view of the device of this invention for the extrusion of raw materials with enzymes added for starch syrup.
Figure 2:
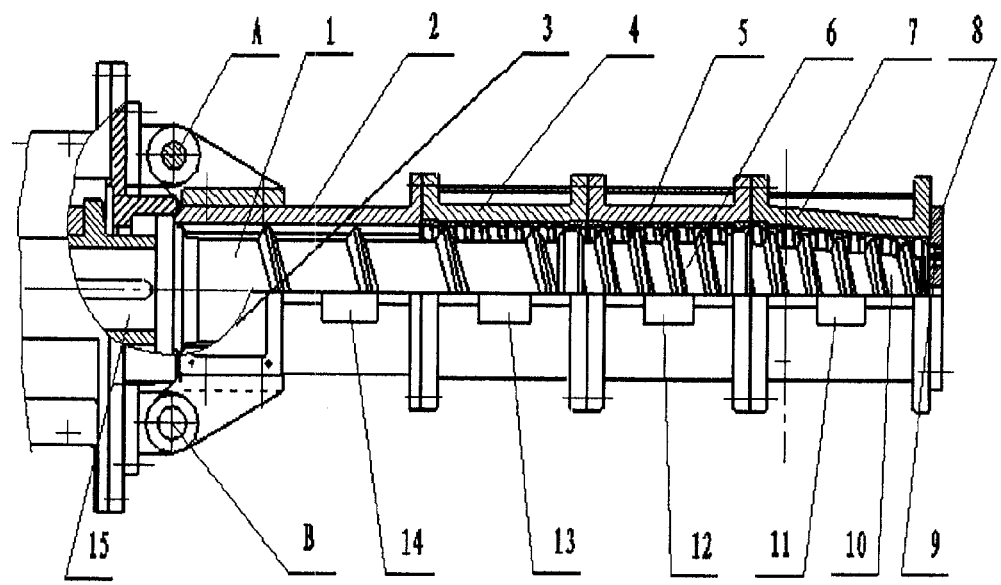
FIG. 2 is the half-sectional view of the top view of the device of this invention for the extrusion of raw materials with enzymes added for starch syrup.

The raw materials for corn syrup, for example, corn degermed with a moisture content percentage being less than 15%, before extrusion, are milled and passed through a sieve with a mesh of 4 mm. Then the milled corn degermed for corn syrup is adjusted to a moisture content percentage of 35% adding the thermostable α-amylase in an amount of 0.85 L or 0.85 kg per ton of corn degermed raw meterial for corn syrup, and adjusted to a pH ranging from 6.0 to 6.2. The obtained mixture of corn degermed grist, water and thermostable α-amylase for corn syrup is then fed through feed inlet 20 into the extrusion device (See FIG. 1 and FIG. 2). The above degermed corn with thermostable α-amylase added in the extruder is rotated and pushed forward by the main shaft 15, the first screw 1, the second screw 6 and the third screw 10 in the extrusion cavity formed between the outer surfaces of the first screw 1, the second screw 6 and the third screw 10 and the inner surfaces of the first barrel 2, the second barrel 4, the third barrel 5 and the fourth barrel 7. Meanwhile, the above degermed corn for corn syrup in the extrusion cavity are heated or cooled by the barrels through thermal conduction. The above extruded corn degermed in the extrusion cavity for corn syrup moving along with the first screw 1, the second screw 6 and the third screw 10 is finally extruded out of the die nozzle 9 of the die plate 8.

The whole of the barrel set of the device of this invention comprises the first barrel 2, the second barrel 4, the third barrel 5 and the fourth barrel 7, wherein each barrel is axially bisectable and the whole of the barrel set is thus also axially bisectable. The first barrel, the second barrel 4, the third barrel 5 and the fourth barrel 7 are assembled in the numbering order and can be closed when the device is in operation by locking the upper part and lower part of each of the above-said barrels with fastener 14 and fastener 16, fastener 13 and fastener 17, fastener 12 and fastener 18, and fastener 11 and fastener 19 respectively. The whole of the screw set comprises the main shaft 15, the first screw 1, the second screw 6 and the third screw 10, wherein each screw is installed enclosing the main shaft 15 in the numbering order and rotates with the main shaft 15. After disassembling the die plate 8 and the above-said fasteners, the two bisectable halves of the whole of the barrel set consisting of the corresponding two bisectable halves of the first barrel 2, the second barrel 4, the third barrel 5 and the fourth barrel 7 assembled together can be rotated outwardedly around shaft A and shaft B respectively so that the two bisectable halves of the whole of the barrel set are opened apart from each other. The first barrel 2 is not heated or cooled. The outer surfaces of the second barrel 4, the third barrel 5 and the fourth barrel 7 are heated by pressurized hot steam or electricity and forcedly cooled by cooling water or air, so that the temperatures in the barrels can be adjusted automatically.

The first screw 1, the second screw 6 and the third screw 10 enclosing the main shaft 15 have external threads in the opposite rotational direction to the continuous internal thread on the inner surface of the second barrel 4, the third barrel 5 and the fourth barrel 7. The external threads of the second screw 6 and the third screw 10 have a helix angle approximately equal to the helix angle of the continuous internal thread on the inner surface of the second barrel 4, the third barrel 5 and the fourth barrel 7. The volume between the end surface of the small end of the third screw 10 and the internal surface of die plate 8 should be 5 times the theoretical output volume produced when the small end of the third screw 10 rotates one revolution. The whole of the screw set has a length-diameter ratio of 8 and a compression ratio of 10. The die nozzle 9 of the die plate 8 has an adjustable diameter ranging from φ14 mm and an adjustable length ranging from 15 mm.

The ranges of parameters of the processing method for the extrusion of degermed corn with thermostable α-amylase added for starch syrup are as follows. The first barrel 2 is not heated or cooled. The second barrel 4, the third barrel 5 and the fourth barrel 7 are in an automatically adjustable temperature ranging from 30° C. to 35° C., 50° C. to 55° C. and 70° C. to 75° C. respectively. The whole of the screw set consisting of the first screw 1, the second screw 6 and the third screw 10 rotates at an adjustable rotation speed ranging from 100 rpm. The extruded corn degermed with thermostable α-amylase added for starch syrup are cooled to room temperature, then are subjected to low-temperature drying with the temperature of drying no higher than 85° C. The dried extruded material, with a moisture content percentage of less than 15%, are milled and passed through a sieve with a mesh of 4 mm. Alternatively, the extruded corn degermed with enzymes added for starch syrup are minced by the cutter, cooled by air drying to room temperature for later use.

The above said extruded corn degermed with thermostable α-amylase added is one kind of raw materials for starch syrup. The raw materials include one kind or more kinds of rice, degermed corn, undegermed corn, sorghum, barley, wheat, or starch or raw starch thereof, extruded with enzymes added.

The saccharogenic method of the above extruded corn degermed with thermostable α-amylase added for starch syrup is as follows. Slurrying of the milled or minced raw materials extruded with thermostable α-amylase added for starch syrup is performed by mixing with water in a ratio of the materials to water of 1:2.5, adjusting to pH=6.0-6.2, adding a suitable amount of calcium ion, acid reagent and thermostable α-amylase in an amount of 0.5 L or 0.5 kg per ton of above corn degermed for starch syrup. Liquefying is performed by raising the temperature to 95° C. and holding the slurry for 40 min. The liquefied slurry is cooled to 45° C. to 70° C. and adjusted to pH=4.2-4.5. Then saccharifying is performed by adding glucoamylase in an amount of 1.2 L or 1.2 kg per ton of corn degermed for starch syrup and holding the slurry for several hours. Enzyme inactivation is performed, after confirmation of the absence of dextrin by anhydrous alcohol, by adjusting to pH=4.8-5.0, heating to 85° C. and holding for 20 min. Then the slurry is cooled to 63° C. and filtered to obtain the saccharification liquor.

During raising the temperature of the above-mentioned slurry, the paddles in the saccharifying tank which stir the slurry, rotate at a speed of 40 rpm, while during keeping the slurry at certain temperature, the paddles rotate at a speed of 30 rpm when liquifying and saccharifying.

The raw materials for starch syrup extruded with enzymes added of this invention can be used to produce low conversion syrup with a DE value less than 20% and medium conversion syrup with a DE value in the range of 38 to 42%, and also high conversion syrup with a DE value greater than 60%.

What is claimed is:
1. A saccharogenic method comprising:
providing a milled or minced, extruded raw material, wherein the raw material was extruded in the presence of an enzyme;
mixing the extruded raw material with water in a ratio of the extruded raw materials to water of 1:1.3 to 1:3.5 to create a slurry;
adjusting a pH of the slurry to a range between 6.0 to 7.0;
adding calcium ion, an acid reagent, α-amylase and glucoamylase to the slurry, wherein α-amylase and glucoamylase are added in an amount of 0.2 L to 1 L or 0.2 kg to 1 kg per ton of the extruded raw material;

liquefying the slurry by raising a temperature of the slurry and holding the slurry at the temperature for 5 minutes to 70 minutes, wherein liquefying occurs between 65° C. and 100° C.;

cooling the temperature of the slurry to 45° C. to 70° C.;

adjusting the pH of the slurry to 3.8 to 5.5 by adding an acid reagent;

saccharifying the slurry by adding calcium ion and 0.4 L to 2 L or 0.4 kg to 2 kg of glucoamylase per ton of the extruded raw material to the slurry and holding the slurry for several hours;

inactivating any α-amylase and glucoamylase present in the slurry by adjusting the pH of the slurry to 4.5 to 5.5, heating the slurry to 80° C. to 95° C., and holding the slurry at 80° C. to 95° C. for 5 minutes to 70 minutes;

cooling the slurry to 60° C. to 70° C.; and filtering the slurry to obtain a saccharification liquor.

2. The saccharogenic method of claim 1, wherein α-amylase is selected from the group consisting of medium-temperature amylase, high temperature-resistant α-amylase, and high-efficient thermostable α-amylase.

3. The saccharogenic method of claim 1, wherein the glucoamylase is selected from the group consisting of glucoamylase, glucose amylase, high-efficient glucoamylase, and strongly-efficient glucoamylase.

4. The saccharogenic method of claim 1, wherein liquefying and saccharifying occur as a result of mixing in a tank having a rotating paddle.

5. The saccharogenic method of claim 4, wherein the paddle rotates at a speed of 4 rpm to 70 rpm when the temperature of the slurry is held constant, and wherein the paddle rotates at a speed of 1 rpm to 60 rpm when the temperature of the slurry is raised.

6. The saccharogenic method of claim 1, wherein providing the extruded raw material further comprises selecting the extruded raw material from the group consisting of rice, degermed corn, undegermed corn, sorghum, barley, wheat, starch, and raw starch.

7. A saccharogenic method comprising:

providing a milled or minced, extruded raw material, wherein the raw material was extruded in the presence of an enzyme;

mixing the extruded raw material with water in a ratio of the extruded raw material to water of 1:1.3 to 1:3.5 to create a slurry;

adjusting a pH of the slurry to a range between 6.0 to 7.0;

adding calcium ion, an acid reagent, α-amylase and glucoamylase to the slurry, wherein α-amylase and glucoamylase are added in an amount of 0.2 L to 1 L or 0.2 kg to 1 kg per ton of the extruded raw material;

liquefying the slurry by spraying above the slurry, raising a temperature of the slurry to 65° C. to 100° C., flash vaporizing the slurry, and then cooling the temperature of the slurry to 60° C. to 90° C. for 5 min to 70 min;

cooling the temperature of the slurry to 45° C. to 70° C.;

adjusting the pH of the slurry to 3.8 to 5.5 by adding an acid reagent;

saccharifying the slurry by adding calcium ion and 0.4 L to 2 L or 0.4 kg to 2 kg of glucoamylase per ton of the extruded raw material to the slurry and holding the slurry for several hours;

inactivating any α-amylase and glucoamylase present in the slurry by adjusting the pH of the slurry to 4.5 to 5.5, heating the slurry to 80° C. to 95° C., and holding the slurry at 80° C. to 95° C. for 5 minutes to 70 minutes;

cooling the slurry to 60° C. to 70° C.; and filtering the slurry to obtain a saccharification liquor.

8. The saccharogenic method of claim 7, wherein α-amylase is selected from the group consisting of medium-temperature amylase, high temperature-resistant α-amylase, and high-efficient thermostable α-amylase.

9. The saccharogenic method of claim 7, wherein the glucoamylase is selected from the group consisting of glucoamylase, glucose amylase, high-efficient glucoamylase, and strongly-efficient glucoamylase.

10. The saccharogenic method of claim 7, wherein liquefying and saccharifying occur as a result of mixing in a tank having a rotating paddle.

11. The saccharogenic method of claim 10, wherein the paddle rotates at a speed of 4 rpm to 70 rpm when the temperature of the slurry is held constant, and wherein the paddle rotates at a speed of 1 rpm to 60 rpm when the temperature of the slurry is raised.

12. The saccharogenic method of claim 7, wherein providing the extruded raw material further comprises selecting the extruded raw material from the group consisting of rice, degermed corn, undegermed corn, sorghum, barley, wheat, starch, and raw starch.

* * * * *

UNITED STATES PATENT AND TRADEMARK OFFICE
CERTIFICATE OF CORRECTION

| | | |
|---|---|---|
| PATENT NO. | : 8,241,685 B2 | |
| APPLICATION NO. | : 12/327156 | |
| DATED | : August 14, 2012 | |
| INVENTOR(S) | : Shen Dechao | |

It is certified that error appears in the above-identified patent and that said Letters Patent is hereby corrected as shown below:

Title Page, Item 73 Assignee:

change "Zibo, Shandong (CN)" to --Zibo City, Shandong (CN)--

Signed and Sealed this
Eighth Day of January, 2013

David J. Kappos
*Director of the United States Patent and Trademark Office*